(12) United States Patent
Knoche et al.

(10) Patent No.: US 9,972,217 B2
(45) Date of Patent: *May 15, 2018

(54) HEALTHCARE EDUCATION CONTENT AUTHORING ASSISTANT WITH INTERACTIVE SUGGESTION INTERFACE BASED ON PATIENT AND CLINICAL RESEARCH DATA

(71) Applicant: i-Human Patients, Inc., Mammoth Lakes, CA (US)

(72) Inventors: Craig Knoche, Mammoth Lakes, CA (US); Anne Knoche, Mammoth Lakes, CA (US)

(73) Assignee: i-Human Patients, Inc., Sunnyvale, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 14/520,162

(22) Filed: Oct. 21, 2014

(65) Prior Publication Data
US 2016/0111020 A1 Apr. 21, 2016

(51) Int. Cl.
G09B 23/28 (2006.01)
G09B 5/00 (2006.01)

(52) U.S. Cl.
CPC .............. *G09B 23/28* (2013.01); *G09B 5/00* (2013.01)

(58) Field of Classification Search
CPC ....................................................... G09B 23/28
USPC ....................................................... 434/262
See application file for complete search history.

(56) References Cited

U.S. PATENT DOCUMENTS

| 6,669,482 | B1* | 12/2003 | Shile | G09B 23/286 434/262 |
| 2004/0107118 | A1* | 6/2004 | Harnsberger | G06F 17/24 705/2 |
| 2006/0004608 | A1* | 1/2006 | Rovinelli | G06Q 50/22 705/2 |

(Continued)

OTHER PUBLICATIONS

Wikipedia: Differential diagnosis, Web Archive, Web. Jul. 9, 2014. <http://web.archive.org/web/20140709022227/http://en.wikipedia.org/wiki/Differential_diagnosis>*

*Primary Examiner* — Thomas Hong
(74) *Attorney, Agent, or Firm* — Invent Capture, LLC.; Samuel S. Cho (57) ABSTRACT

A healthcare content authoring software platform incorporates a healthcare education content authoring assistant software with interactive suggestion interface to assist a healthcare education content author in creating computerized healthcare education contents. The interactive suggestion interface in the healthcare education content authoring assistant software provides at least one of a symptom selection interface, a symptom characterization and medial exam description entry interface, a pivotal concept definition interface, a results group configuration interface, a disease summary interface, a disease epidemiology interface, an etiology task exploration interface, and a tests diagnostics strategy and pitfalls interface, wherein one or more of these interfaces empower the healthcare education content author to create, update, and manage a plurality of diagnostic reasoning pathways that encourage students and healthcare industry trainees to nurture basic linear DDx reasoning skills, dynamic DDx reasoning skills, and other clinically-empirical reasoning skills in a simulated patient diagnostic environment with a virtual patient.

4 Claims, 9 Drawing Sheets

AN INSTRUCTION MENU INTERFACE SCREENSHOT FROM THE HEALTHCARE EDUCATION CONTENT AUTHORING ASSISTANT (56) References Cited

U.S. PATENT DOCUMENTS

2014/0122109 A1\* 5/2014 Ghanbari .............. G06F 19/345
 705/2

\* cited by examiner

FIG. 1

AN INSTRUCTION MENU INTERFACE SCREENSHOT FROM THE HEALTHCARE EDUCATION CONTENT AUTHORING ASSISTANT
100 i-HUMAN OSLER WIZARD EDITOR - ALPHA    WELCOME: ANNE TWEET

INSTRUCTIONS

THE FOLLOWING DESCRIBES THE STEPS YOU WILL GO THROUGH TO CREATE AN I-HUMAN OSLER WIZARD AUTHORING TEMPLATE. THE TEMPLATE WILL ULTIMATELY BE USED TO GUIDE THE CASE AUTHORING PROCESS FOR SPECIFIC CASES AND PROVIDE MORE MEANINGFUL STUDENT FEEDBACK FOR EACH CASE.

1. SPECIFY THE SYMPTOM CHARACTERIZATION QUESTIONS THAT SHOULD ALWAYS BE ASKED OF THE PATIENT AT THE START OF THE DIAGNOSTIC REASONING PROCESS. IN THE CASE OF "SYSTEM-BASED COMPLAINTS/SYMPTOMS" (E.G. ACID/BASE IMBALANCE), YOU WILL SELECT QUESTIONS TO ASK THE PATIENT THAT CHARACTERIZE THE SYMPTOM-SPECIFIC COMPLICATIONS.

NOTE: THE SPECIFIC RESULTS OF THESE QUESTIONS AS THEY DETERMINE THE DIAGNOSTIC PATH ARE SPECIFIED LATER IN THE DIAGNOSTIC REASONING STEPS.

2. SPECIFY THE PHYSICAL EXAMS THAT SHOULD ALWAYS BE PERFORMED FOR THIS COMPLAINT REGARDLESS OF DIAGNOSTIC REASONING PATH.
3. FOR LAB ABNORMALITY SYMPTOMS SPECIFY THE TESTS THAT SHOULD ALWAYS BE PERFORMED FOR THIS COMPLAINT REGARDLESS OF DIAGNOSTIC REASONING PATH.
4. SPECIFY THE KEY PIVOTAL CONCEPTS THAT DIRECT THE DIAGNOSTIC REASONING PROCESS. A PIVOTAL CONCEPT SERVES TO LIMIT THE BROAD DIFFERENTIAL DIAGNOSIS TO SMALLER SUBSETS OF POSSIBILITIES. NOTE: FOR EACH STEP IN THE REASONING PATH YOU CAN DEFINE ONLY ONE PIVOTAL CONCEPT.
5. SPECIFY PIVOTAL CONCEPT THAT DIRECT THE REASONING PROCESS. FOR A PIVOTAL CONCEPT, SPECIFY THE TASK(S) (HX QUESTIONS, PHYSICAL EXAMS, TESTS) THE STUDENT SHOULD PERFORM. FOR EXAMPLE, FOR THE PIVOTAL CONCEPT "LOCATION OF ABDOMINAL PAIN" THE TASKS MIGHT BE: TO ASK THE PATIENT MORE PRECISELY WHERE IT HURTS AND TO PALPATE THE ABDOMEN.
6. SPECIFY RESULTS GROUPS OF A PIVOTAL CONCEPT - A PIVOTAL CONCEPT WILL RESULT IN GROUPINGS OF POSSIBLE DISEASES FOR THE STUDENT TO CONSIDER. FOR EXAMPLE, THE PIVOTAL CONCEPT "LOCATION OF ABDOMINAL PAIN" FOCUSES THE STUDENT ON DDX SUBSETS, EACH PERTINENT TO PARTICULAR AREAS OF THE ABDOMEN (RUQ, LUQ, ETC).
7. SPECIFY PIVOTAL CONCEPT TASK RESULTS - FOR EACH POSSIBLE RESULT GROUP, SPECIFY THE RESULTS OF THE PIVOTAL CONCEPT TASKS THAT DETERMINED THE PATH TO THE RESULT GROUP. FOR EXAMPLE, THE RESULT OF THE TASK "PALPATE THE ABDOMEN" THAT WOULD LEAD TO THE RUQ RESULT GROUP WOULD BE "TENDERNESS OF THE RUQ".
8. SPECIFY DEPENDENT PIVOTAL CONCEPTS AS NEEDED. FOR EACH RESULTS GROUP CONSIDER IF THERE ARE ANY OTHER IMPORTANT PIVOTAL CONCEPTS THAT FURTHER DIRECT THE REASONING PROCESS FOR THE GROUP. FOR EXAMPLE, FOR THE RESULTS GROUP "RUQ ABDOMINAL PAIN", A FURTHER PIVOTAL CONCEPT IS "JAUNDICE" WHICH BIFURCATES THE DDX INTO 2 DIFFERENT RESULTS GROUPS. KEEP IN MIND A PIVOTAL CONCEPT SHOULD BE PEDAGOGICALLY SIGNIFICANT TO GROUP DISEASES. FOR ACTUALLY EXPLORING THE POSSIBILITY OF A PARTICULAR DISEASE, YOU WILL SPECIFY "EXPLORE" TASKS FOR EACH DISEASE.
9. SPECIFY DISEASES IN DDX GROUPS FOR EACH RESULTS GROUP THAT DOES NOT HAVE A PIVOTAL CONCEPT, THERE SHOULD NOW BE ONE LIST OF DISEASES (DDX GROUP) TO CONSIDER. SPECIFY THE DISEASES IN THAT GROUP.
10. SPECIFY DISEASE EPIDEMIOLOGY FOR EACH DISEASE IN THE DDX GROUP SPECIFY THE EPIDEMIOLOGY FOR THIS DISEASE IN GENERAL REGARDLESS OF PRESENTING COMPLAINT/PIVOTAL CONCEPTS THAT LED TO CONSIDERATION OF THIS DISEASE.
11. SPECIFY DISEASE "EXPLORE" TASKS AND EVIDENCE-BASED DATA. FOR EACH DISEASE, SPECIFY INFORMATION THE STUDENT SHOULD EXPLORE TO RULE IN/RULE OUT THE POSSIBILITY OF THE DISEASE REGARDLESS OF THE PRESENTING COMPLAINT/PIVOTAL CONCEPT THAT LED TO THIS DISEASE. NOTE YOU WILL SPECIFY THIS IN TERMS OF THE TASKS (HX QUESTIONS, PHYSICAL EXAMS) THAT A STUDENT SHOULD PERFORM TO ELICIT THIS INFORMATION, AND WHAT THE RESULT SHOULD BE.

INSTRUCTIONS
SYMPTOMS
DISEASES
NOTIFICATIONS — 103

A SYMPTOM SELECTION INTERFACE SCREENSHOT FROM THE HEALTHCARE EDUCATION CONTENT AUTHORING ASSISTANT
200

FIG. 3

FIG. 4 i-HUMAN OSLER WIZARD EDITOR - ALPHA     WELCOME: ANNE TWEET

<RUQ     TEST-ABDOMINAL PAIN-PRESENCE OF JAUNDICE

PIVOTAL CONCEPT TITLE: [PRESENCE OF JAUNDICE] ← 403

[HELP]     REQUIRED PIVOTAL TASKS     [EDIT]

| TYPE | TASK |
|------|------|
| EXAM | INSPECT EYES (ID:2707) |
| EXAM | INSPECT SKIN OVERALL (ID:2702) |

← 407

[HELP]     RESULT GROUPS     [ADD RESULT GROUP]

DELETE POSITIVE JAUNDICE
DELETE NEGATIVE JAUNDICE    ∧ ∧

← 405 i-human PATENTS    ← 201

INSTRUCTIONS
SYMPTOMS
DISEASES
NOTIFICATIONS

▽ TEST-ABDOMINAL PAIN
  ▽ ⚲ LOCATION OF PAIN   ← 401
    ▽ RUQ
      ▽ ⬚ PRESENCE OF JAUNDICE
         ⚹ POSITIVE JAUNDICE
         ⚹ ASCENDING CHOLANGITIS
         ⚹ CHOLEDOCHOLITHIASIS
         ⚹ HEPATITIS, ALCOHOLIC
       △ NEGATIVE JAUNDICE
     △ LUQ
     △ RLQ
     △ LLQ
     △ EPIGASTRIC
     △ DIFFUSE OR PERIUMBILICAL
     △ SUPRAPUBIC
     △ BACK OR FLANK A PIVOTAL CONCEPT DEFINITION INTERFACE SCREENSHOT FROM THE HEALTHCARE EDUCATION CONTENT AUTHORING ASSISTANT 400

FIG. 5

A PIVOTAL CONCEPT RULE FOR RESULT GROUP INTERFACE SCREENSHOT FROM THE HEALTHCARE EDUCATION CONTENT AUTHORING ASSISTANT
500

FIG. 6

A DDx GROUP AND DISEASE SUMMARY INTERFACE SCREENSHOT FROM THE HEALTHCARE EDUCATION CONTENT AUTHORING ASSISTANT 600 i-HUMAN OSLER WIZARD EDITOR - ALPHA                WELCOME: ANNE TWEET

ASCENDING CHOLANGITIS

<DISEASES>

[HELP]
AUTHOR: _______703_______ LAST UPDATED: 2014-06-09 15:20:13.0

DDx GROUPS (4 GROUP(S))

ABDOMINAL PAIN => NONE => EPIGASTRIC => ACUTE
ABDOMINAL PAIN => NONE => RUQ => ACUTE          705
ABDOMINAL PAIN => JAUNDICE => OBSTRUCTIVE
TEST-ABDOMINAL PAIN => RUQ => POSITIVE JAUNDICE

SPECIFY DISEASE EPIDEMIOLOGY - REGARDLESS OF PRESENTING COMPLAINT/PIVOTAL CONCEPTS THAT LEAD TO THIS DISEASE
PREVALENCE:  ○ COMMON  ⦿ UNCOMMON                                          707
MUST NOT MISS:  ○ YES  ⦿ NO
RACE:  ☑ ASIAN  ☑ BLACK  ☑ HISPANIC  ☑ WHITE
GENDER/AGE    AGE MIN          AGE MAX
         ☑ MALE    [20]           [   ]
         ☑ FEMALE  [20]           [   ]

EXPLORE TASKS                                   11 TASK(S)
TESTS                                           10 TEST(S)

INSTRUCTIONS
SYMPTOMS
DISEASES
NOTIFICATIONS
          701

A DISEASE EPIDEMIOLOGY INTERFACE SCREENSHOT FROM THE HEALTHCARE EDUCATION CONTENT AUTHORING ASSISTANT
700

FIG. 7 i-HUMAN OSLER WIZARD EDITOR - ALPHA    ASCENDING CHOLANGITIS-EXPLORE TASKS    WELCOME: ANNE TWEET

701 <ASCENDING CHOLANGITIS>

HELP      ETIOLOGIES:      [ADD ETIOLOGY]

| | |
|---|---|
| DELETE ALL ETIOLOGIES | 9 TASK(S) |
| DELETE CHRONIC HEMOLYSIS (BILIRUBIN STONES) 801 | 2 TASK(S) |

SUMMARY OF EXPLORE TASKS USED BY ETIOLOGY. (TO EDIT, CLICK ON THE ETIOLOGY ABOVE)

| ETIOLOGIES | TYPE | EXPLORE TASK | RESULT | CATEGORY | IMPORTANCE | EVIDENCE DATA |
|---|---|---|---|---|---|---|
| ALL ETIOLOGIES | HISTORY | WHAT IS THE COLOR OF YOUR URINE AND HAS IT CHANGE RECENTLY | DARK URINE (WOULD SUG | ASSOCIATED SX | HIGHLY SUGGESTIVE | N/A |
| ALL ETIOLOGIES | EXAM | INSPECT SKIN OVERALL | JAUNDICE | SIGN | | N/A |
| ALL ETIOLOGIES | EXAM | INSPECT EYES | JAUNDICE OR YELLOW SC | SIGN | | [SENSITIVITY (%)] |
| ALL ETIOLOGIES | HISTORY | WHERE MORE PRECISELY IS THE PAIN IN YOUR ABDOMEN? | RUQ | ASSOCIATED SX | | [SENSITIVITY (%)] |
| ALL ETIOLOGIES | EXAM | TEMPERATURE | FEBRILE (> 38.0) | SIGN | | [SENSITIVITY (%)] |
| ALL ETIOLOGIES | HISTORY | DO YOU HAVE ANY PAIN IN YOUR ABDOMEN? | YES | ASSOCIATED SX | | N/A |
| ALL ETIOLOGIES | HISTORY | DO YOU HAVE FEVER SYMPTOMS? | YES | RISK FACTOR | | N/A |
| ALL ETIOLOGIES | HISTORY | DO YOU HAVE SHAKING CHILLS? | YES (SUGGESTS BACTERI | RISK FACTOR | HIGHLY SUGGESTIVE | N/A |
| ALL ETIOLOGIES | HISTORY | DO YOU OR ANY FAMILY MEMBER HAVE A HISTORY OF GALLSTON | YES (PERSONAL HISTORY | RISK FACTOR | | N/A |
| CHRONIC HEMOLYSIS (BILIRU | HISTORY | DO YOU HAVE A HISTORY OF CHRONIC HEMOLYTIC ANEMIA SUC | YES | RISK FACTOR | | N/A |
| CHRONIC HEMOLYSIS (BILIRU | HISTORY | DO YOU HAVE THALASSEMIA? | YES | RISK FACTOR | | N/A |

803

AN ETIOLOGY TASK EXPLORATION INTERFACE SCREENSHOT FROM THE HEALTHCARE EDUCATION CONTENT AUTHORING ASSISTANT
800

A TEST DIAGNOSTICS STRATEGY AND PITFALLS INTERFACE SCREENSHOT FROM THE HEALTHCARE EDUCATION CONTENT AUTHORING ASSISTANT

HEALTHCARE EDUCATION CONTENT AUTHORING ASSISTANT WITH INTERACTIVE SUGGESTION INTERFACE BASED ON PATIENT AND CLINICAL RESEARCH DATA

FIELD OF THE INVENTION

The present invention generally relates to interactive educational software, computerized user interfaces, and electronic systems. The present invention also relates to one or more healthcare education software programs, systems, and methods. More specifically, the present invention also relates to a healthcare education content authoring assistant and a healthcare content authoring graphical user interface, which are executed by a computer or another electronic device.

INCORPORATION BY REFERENCE

A US non-provisional patent application U.S. Ser. No. 14/450,186, titled "Electronic Healthcare Education System and Method," and filed on Aug. 1, 2014, is incorporated herein by reference.

BACKGROUND OF THE INVENTION

Electronic learning (e-learning) and educational training in today's healthcare industry tend to focus on passive learning based on a linear presentation of medical information and a subsequently serialized testing of the presented medical information. For example, in a conventional method of presenting clinical training information over a computerized interface, a medical student, a paramedic trainee, a nursing trainee, or another healthcare industry professional is typically presented with linearly-broadcasted medical information that lacks interactive, hands-on, and empirical clinical training experience.

Unfortunately, the linearly-broadcasted medical information presented to a healthcare trainee is often detached from the reality of clinical practice, especially in case of diagnostic reasoning and differential diagnosis training for patient conditions and symptoms. In real-life clinical practice, a seasoned physician relies on his or her clinical knowledge and experience to conduct a time-efficient and educated guess for identifying a particular disease. In most circumstances, the seasoned physician does not linearly and exhaustively search through all possible differential diagnosis to identify the particular disease. The ability to identify a patient's disease correctly, based on one's own clinical knowledge and experience, is called "dynamic DDx," or dynamic differential diagnosis. Conventional e-learning products in the healthcare industry are unable to instill trainees with dynamic differential diagnosis reasoning skills, which is an invaluable skill set in real-life clinical practice for an effective and rapid patient diagnosis.

Furthermore, conventional e-learning training and educational methods lack a convenient and scalable electronic platform for a healthcare educator to create, add, or change healthcare training contents that can nurture standard linear DDx reasoning skills, dynamic DDx reasoning skills, and/or other empirical clinical reasoning skills in healthcare industry trainees and medical students. At best, conventional e-learning solutions require the healthcare educator to modify or configure a substantial part of computer software codes or underlying software modules in order to change or update healthcare training contents.

In addition, conventional e-learning training and educational systems do not provide a computerized interactive suggestion interface to a healthcare educator to suggest and recommend additions or modifications to specific healthcare educational contents from a robust set of clinical research data sets that are dynamically linked to a healthcare content authoring platform.

Therefore, it may be desirable to provide a novel and intuitive healthcare content authoring software platform with an interactive suggestion interface, which a healthcare education content author can readily utilize to create and update computerized medical training and evaluation contents to medical students and trainees. Furthermore, it may also be desirable to provide a novel healthcare education content authoring assistant that enables nurturing of DDx-based reasoning skills and/or other empirical clinical reasoning skills in medical students and other healthcare industry professionals.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a healthcare education content authoring assistant system with an interactive suggestion interface based on patient and clinical research data is disclosed. This system comprises: a symptom selection interface module that generates a list of diagnostic reasoning symptoms and prompts a healthcare education content author to select a symptom of educational interest; a component definition interface module that defines and configures symptom characteristics, mandatory physical exams, and diagnostic reasoning concepts for the symptom of educational interest; a pivotal concept definition interface module that defines a pivotal concept, a pivotal concept task, and an association among the pivotal concept, the pivotal concept task, and a results group; a pivotal concept rule for results group interface module that defines and describes a result of the pivotal concept task and a pivotal concept rule, wherein the pivotal concept rule associates or disassociates the result of the pivotal concept task with the pivotal concept; a differential diagnosis (DDx) group and disease summary interface module that displays a symptom-to-diagnosis reasoning path that shows links among the symptom of educational interest, the pivotal concept, the pivotal concept task, the result of the pivotal concept task, the pivotal concept rule, and one or more diseases, wherein the symptom-to-diagnosis reasoning path is additionally flagged as typical or atypical for a DDx group; and a central processing unit (CPU) and a memory unit of a computer system or another electronic device, wherein the CPU and the memory unit execute at least one of the symptom selection interface module, the component definition interface module, the pivotal concept definition interface module, the pivotal concept rule for results group interface module, and the differential diagnosis (DDx) group and disease summary interface module.

In another embodiment of the invention, a method of operating a healthcare education content authoring assistant software is disclosed. This method comprises the steps of: selecting a symptom of educational interest from a list of available diagnostic reasoning symptoms displayed on a symptom selection interface, which is part of the healthcare education content authoring assistant software executed on the CPU and the memory unit of the computer system or another electronic device; entering definitions and descriptions for at least one of symptom characteristics, mandatory physical exams, and diagnostic reasoning concepts for the symptom of educational interest to the healthcare education content authoring assistant software through a component definition interface, which is part of the healthcare education content authoring assistant software executed on the CPU and the memory unit of the computer system or another electronic device; generating a pivotal concept, a pivotal concept task, and an association among the pivotal concept, the pivotal concept task, and a results group through a pivotal concept definition interface, which is part of the healthcare education content authoring assistant software executed on the CPU and the memory unit of the computer system or another electronic device; entering definitions and descriptions for a result of the pivotal concept task; composing a pivotal concept rule that associates or disassociates the result of the pivotal concept task with the pivotal concept; associating the pivotal concept, the pivotal concept task, the result of the pivotal concept task, and the pivotal concept rule to one or more diseases; and generating one or more symptom-to-diagnosis reasoning path names and displaying one or more symptom-to-diagnosis reasoning paths through a differential diagnosis (DDx) group and summary interface, wherein each symptom-to-diagnosis reasoning path shows links among the symptom of educational interest, the pivotal concept, the pivotal concept task, the result of the pivotal concept task, the pivotal concept rule, and the one or more diseases, and wherein the differential diagnosis (DDx) group and summary interface is part of the healthcare education content authoring assistant software executed on the CPU and the memory unit of the computer system or another electronic device.

BRIEF DESCRIPTION OF DRAWINGS

FIG. 1 shows an instruction menu interface screenshot from a healthcare education content authoring assistant executed on a computer or another electronic device, in accordance with an embodiment of the invention.

FIG. 6 shows a differential diagnosis (DDx) group and disease summary interface screenshot from the healthcare education content authoring assistant executed on the computer or another electronic device, in accordance with an embodiment of the invention.

FIG. 8 shows an etiology task exploration interface screenshot from the healthcare education content authoring assistant executed on the computer or another electronic device, in accordance with an embodiment of the invention.

FIG. 9 shows a test diagnostics strategy and pitfalls interface screenshot from the healthcare education content authoring assistant executed on the computer or another electronic device, in accordance with an embodiment of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for electronic healthcare education and healthcare education content authoring assistant program executed on a computer system or another electronic device. Furthermore, the detailed description is also presented largely in terms of descriptions and/or other symbolic representations that directly or indirectly resemble computerized user interfaces for a healthcare education content authoring assistant program for healthcare education content authors and educators. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "healthcare education content authoring assistant" is defined as a healthcare education content authoring software that provides a convenient content authoring user interface with an interactive suggestion interface to a healthcare education content author. Preferably, the interactive suggestion interface assists the healthcare education content author in creating a computerized healthcare education content by providing clinically empirical and meaningful information gathered from real-life patient and clinical research data. Furthermore, in a preferred embodiment of the invention, the healthcare education content authoring assistant enables the healthcare education content author to create, modify, and/or update simulated virtual patient cases for interactive and virtualized real-life-like clinical training of medical education software users (e.g. medical students, healthcare professionals, and other users) to introduce and nurture DDx-based reasoning skills and/or other empirical clinical reasoning skills in the trainees' education. The healthcare education content authoring assistant is configured to be executed on a CPU and a memory unit of a computer system or another electronic device. The computer system may be a cloud-networked server, a desktop computer, a portable electronic device, or another electronic device.

In addition, for the purpose of describing the invention, a term "pivotal concept" is defined as an important keystone that optimizes a diagnostic reasoning process to a focused differential diagnosis involving a smaller subset of possibilities, instead of distracting a healthcare professional or a student to a raw list of possible diseases associated with symptoms. The pivotal concept can be utilized to train a medical student or a healthcare professional to achieve a time-efficient and accurate diagnosis of a patient's disease or condition.

In a preferred embodiment of the invention, a pivotal concept can be defined via a pivotal concept definition interface, and also be organized in a results group interface provided by the healthcare education content authoring assistant program, which is executed on a CPU and a memory unit of a computer system or another electronic device.

Furthermore, for the purpose of describing the invention, a term "differential diagnosis," or "DDx" is defined as a list of potentially-correct diagnosis for a medical or healthcare condition of a patient. Through a process of elimination, logical deduction, linear reasoning, and/or dynamic differential diagnosis, a healthcare professional can find a correct diagnosis for the patient's medical or healthcare condition.

In addition, for the purpose of describing the invention, a term "dynamic differential diagnosis," or "dynamic DDx," is defined as an ability and an empirical process to make and to refine an educated guess expeditiously for a likely diagnosis based on one's own clinical knowledge and experience, without necessitating an exhaustive iterative matching between patient symptoms and a list of potential diseases.

Moreover, for the purpose of describing the invention, a term "authoring interface," or "authoring user interface," is defined as a graphical user interface-based (GUI-based) healthcare education content creation and updating platform for a healthcare education content author. In a preferred embodiment of the invention, the authoring interface does not require a healthcare education content author to understand and modify computer programming codes for creating or modifying healthcare education contents. Instead, the authoring interface provides a graphical user interface and standardized tools for quick and seamless healthcare education content creation and modifications.

In addition, for the purpose of describing the invention, a term "electronic healthcare education system" is defined as a healthcare education software executed on a CPU and a memory unit of a computer system or another electronic device, which is utilized to educate and train healthcare trainees, professionals, students, and other users such as physicians, medical students, physician assistants, nurses, emergency response personnel, and other healthcare workers.

One aspect of an embodiment of the present invention is providing a novel and intuitive healthcare content authoring software platform that a healthcare education content author can readily utilize to configure, provide, and update computerized medical training and evaluation contents to medical students and trainees.

Another aspect of an embodiment of the present invention is incorporating a novel healthcare education content authoring assistant in the healthcare content authoring software platform to provide interactive suggestions based on clinical and patient clinical research data, so that the healthcare education content author can uniquely create computerized medical training and evaluation contents that nurture linear or dynamic DDx-based reasoning skills and other empirical clinical reasoning skills in medical students and healthcare industry professionals.

Yet another aspect of an embodiment of the present invention is providing a computerized interactive suggestion interface to a healthcare educator to suggest and recommend additions or modifications to specific healthcare educational contents from a robust set of clinical research data sets that are dynamically linked to a healthcare content authoring platform. In a preferred embodiment of the invention, the clinical research data sets, which are accessible by the computerized interactive suggestion interface for advising the healthcare educator during education content creation, include sensitivity and specificity information and diagnosis likelihood ratios for all possible diagnosis that can be generated from the healthcare content authoring software platform. Furthermore, in the preferred embodiment of the invention, the clinical research data sets may also include epidemiological information associated with all possible diagnosis that can be generated from the healthcare content authoring software platform.

FIG. 1 shows an instruction menu interface screenshot (100) from a healthcare education content authoring assistant executed on a computer or another electronic device, in accordance with an embodiment of the invention. In a preferred embodiment of the invention, the instruction menu interface for the healthcare education content authoring assistant provides an "Instructions" button (101), a "Symptoms" button, a "Diseases" button, and a "Notifications" button, as shown on a left side of the instruction menu interface screenshot (100). In a right side of the instruction menu interface screenshot (100), an instructions content section (103) provides specific guidance to a healthcare education content creator for utilizing the healthcare education content authoring assistant.

In the preferred embodiment of the invention, the specific guidance for utilizing the healthcare education content authoring assistant involves eleven steps when the "Instructions" button (101) is invoked, as shown in the instruction menu interface screenshot (100). The first step is to specify symptom characterizations. The healthcare education content author is instructed to compose or select questions that should always be asked from a patient by a healthcare trainee (e.g. a medical student, a nursing student, or any other healthcare professional in training) at the start of a diagnostic reasoning process. For example, in case of "system-based complaints/symptoms" (e.g. acid/base imbalance), the healthcare education content author is instructed by the healthcare education content authoring assistant to select or compose questions for the healthcare trainee, who should be asking the patient a set of pertinent questions associated with symptom-specific complications. Preferably, when the healthcare education content is executed by an electronic healthcare education system, a healthcare trainee can experience different diagnostic paths and learn how to optimize his or her diagnostic reasoning, based on a particular question pathway that the healthcare trainee chooses in asking questions to a virtual patient.

Continuing with FIG. 1, in the preferred embodiment of the invention as shown in the instruction menu interface screenshot (100), the second step of the specific guidance for utilizing the healthcare education content authoring assistant by the healthcare education content author is to specify physical exams, which should always be performed for the virtual patient regardless of diagnostic reasoning paths. Then, the third step of the specific guidance for utilizing the healthcare education content authoring assistant by the healthcare education content author is to specify medical tests for lab abnormality symptoms. In general, these medical tests should always be performed for the virtual patient if there are lab abnormality symptoms, regardless of diagnostic reasoning paths.

Then, as shown in the instruction menu interface screenshot (100) in FIG. 1, the fourth step of the specific guidance for utilizing the healthcare education content authoring assistant by the healthcare education content author is to specify key pivotal concepts, which direct the diagnostic reasoning process. In the preferred embodiment of the invention, a pivotal concept guides a healthcare trainee to limit the broad differential diagnosis to smaller subsets of possibilities. Preferably, each step in the diagnostic reasoning path includes, at most, one pivotal concept to maintain focus and efficiency in the diagnostic reasoning. Subsequently, as the fifth step of the specific guidance for utilizing the healthcare education content authoring assistant by the healthcare education content author, pivotal concept tasks are specified (e.g. health questions, physical exams, tests, and etc.), which need to be followed by the healthcare trainee to further direct the diagnostic reasoning process. For example, for a pivotal concept of "location of abdominal pain," two pivotal concept tasks for the healthcare trainee may involve (1) asking the virtual patient to pinpoint a pain location and (2) palpating the abdomen.

Continuing with FIG. 1, in the preferred embodiment of the invention as shown in the instruction menu interface screenshot (100), the sixth step of the specific guidance for utilizing the healthcare education content authoring assistant by the healthcare education content author is to specify results groups of a pivotal concept. The pivotal concept can be utilized to organize groupings of possible diseases for the healthcare trainee to consider. For example, the pivotal concept of "location of abdominal pain" focuses the healthcare trainee on differential diagnosis (DDx) subsets related to particular areas of the virtual patient's abdomen (e.g. RUQ, LUQ, and etc.).

Then, as shown in the instruction menu interface screenshot (100), the seventh step of the specific guidance for utilizing the healthcare education content authoring assistant by the healthcare education content author is to specify pivotal concept tasks results. For each results group associated with a pivotal concept, results of the pivotal concept tasks that determined the path to the results group can be specified by the healthcare education content author. For example, the result of the task "palpate the abdomen," which leads to a right upper quadrant (RUQ) results group, may be "tenderness of the RUQ," or another result specified by the healthcare education content author.

Subsequently, as shown in the instruction menu interface screenshot (100) in FIG. 1, the eighth step of the specific guidance for utilizing the healthcare education content authoring assistant by the healthcare education content author is to specify dependent pivotal concepts, if necessary. For each results group with a "parent" pivotal concept, the healthcare education content author can compose or select additional pivotal concepts that may depend from the parent pivotal concept, wherein the additional pivotal concepts enable further guidance of the diagnostic reasoning process for the results group. For example, for a results group "RUQ abdominal pain," an additional pivotal concept may be "jaundice," which divides this diagnostic reasoning path into two different results groups. Preferably, a pivotal concept composed or selected by the healthcare education content author through the healthcare education content authoring assistant is pedagogically significant to group diseases, and exploratory tasks to the healthcare trainee can be specified for each disease.

Continuing with FIG. 1, as shown in the instruction menu interface screenshot (100), the ninth step of the specific guidance for utilizing the healthcare education content authoring assistant by the healthcare education content author is to specify diseases in differential diagnosis (DDx) groups. For example, if a results group does not have a pivotal concept, the healthcare education content author may want to add or specify one or more diseases in a DDx group. Then, as the tenth step of the specific guidance for utilizing the healthcare education content assistant, the healthcare education content author can specify the epidemiology for each disease listed in the DDx group in the healthcare education content assistant.

Lastly, as shown in the instruction menu interface screenshot (100) in FIG. 1, the eleventh step of the specific guidance for utilizing the healthcare education content authoring assistant by the healthcare education content author is to specify disease exploration tasks and evidence-based data. For each disease, the healthcare education content author can specify information that the healthcare trainee should explore to rule in or rule out the possibility of the disease, regardless of the presented medical condition described by the virtual patient or the pivotal concept linked to the disease. Preferably, the disease exploration tasks and evidence-based data can be presented as health diagnostic questions or physical exams, which induce the healthcare trainee to perform on the virtual patient and to predict results.

Figure 2:
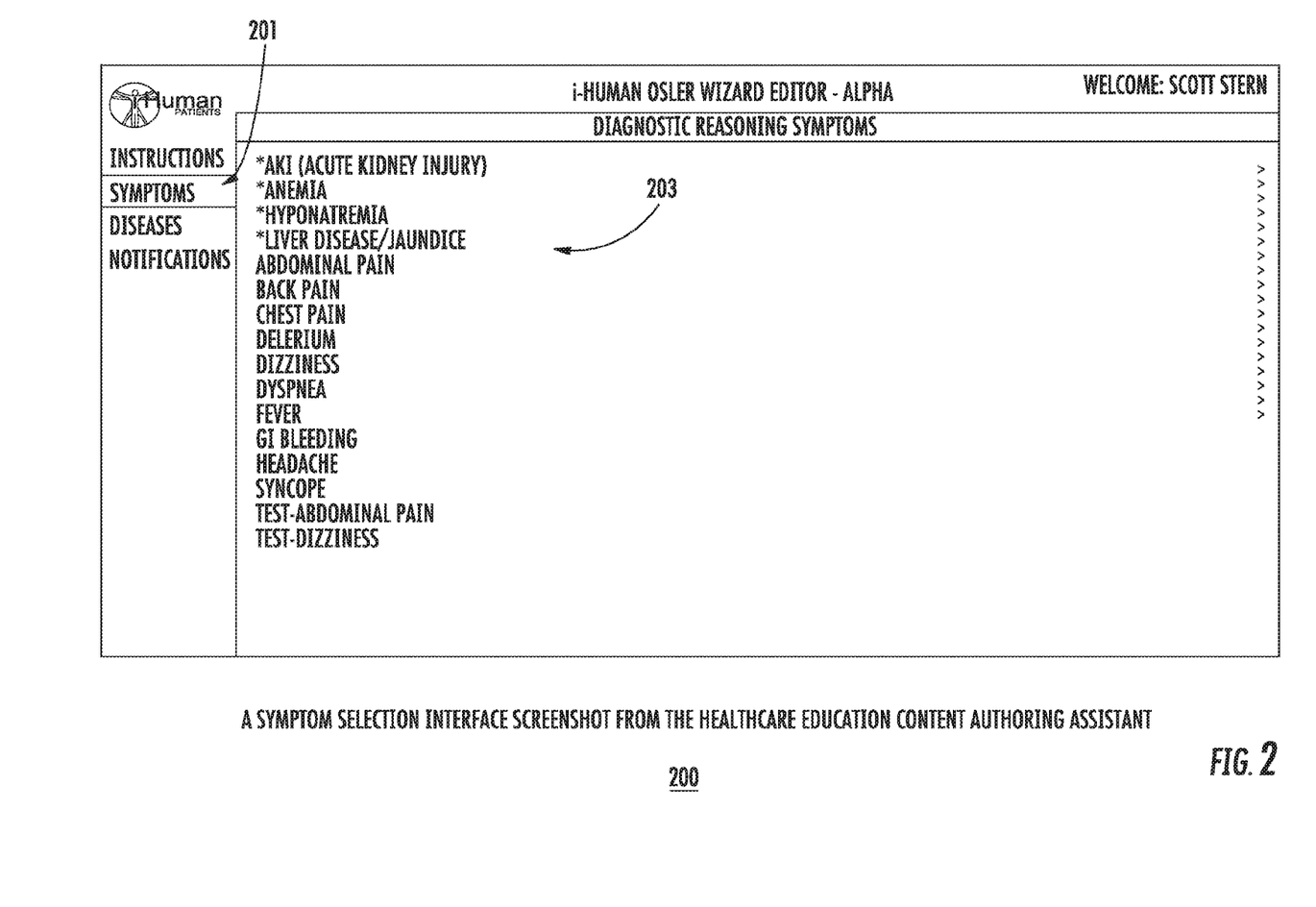
FIG. 2 shows a symptom selection interface screenshot from the healthcare education content authoring assistant executed on the computer or another electronic device, in accordance with an embodiment of the invention.

FIG. 2 shows a symptom selection interface screenshot (200) from the healthcare education content authoring assistant executed on the computer or another electronic device, in accordance with an embodiment of the invention. In this embodiment of the invention, the symptom selection interface for the healthcare education content authoring assistant provides an "Instructions" button, a "Symptoms" button (201), a "Diseases" button, and a "Notifications" button, as shown on a left side of the symptom selection interface screenshot (200). In a right side of the symptom selection interface screenshot (200), a diagnostic reasoning symptoms section (203) incorporates an interactive suggestion interface that can assist a healthcare education content author to create, modify, and/or update healthcare education contents. In a preferred embodiment of the invention, the computerized interactive suggestion interface to the healthcare education content author suggests and recommends additions or modifications to specific healthcare educational contents from a robust set of clinical research data sets that are dynamically linked to the healthcare education content authoring assistant. Preferably, the clinical research data sets, which are accessible by the computerized interactive suggestion interface for advising the healthcare educator during education content creation, include sensitivity and specificity information and diagnosis likelihood ratios for all possible diagnosis that can be generated from the healthcare content authoring software platform. Furthermore, the clinical research data sets may also include epidemiological information associated with all possible diagnosis that can be generated from the healthcare content authoring software platform.

In this particular example as shown in the symptom selection interface screenshot (200), the interactive suggestion interface in the diagnostic reasoning symptoms section (203) provides a list of selectable symptoms, such as acute kidney injury, anemia, hyponatremia, liver disease/jaundice, abdominal pain, back pain, chest pain, delirium, dizziness, and other diagnostic reasoning symptoms. The healthcare education content author can select a particular symptom (e.g. abdominal pain) from the diagnostic reasoning symptoms section (203) and subsequently specify diagnostic reasoning paths for students and other healthcare trainees. In one embodiment of the invention, the healthcare education content author may be able to create and define a new symptom in the symptom selection interface, if the healthcare education content author has an appropriate symptom interface modification privileges with the healthcare education content authoring assistant software. In another embodiment of the invention, the healthcare education content author is only allowed to select from available symptoms listed in the diagnostic reasoning symptoms section (203), without having write privileges to the diagnostic reasoning symptoms section (203).

Figure 3:
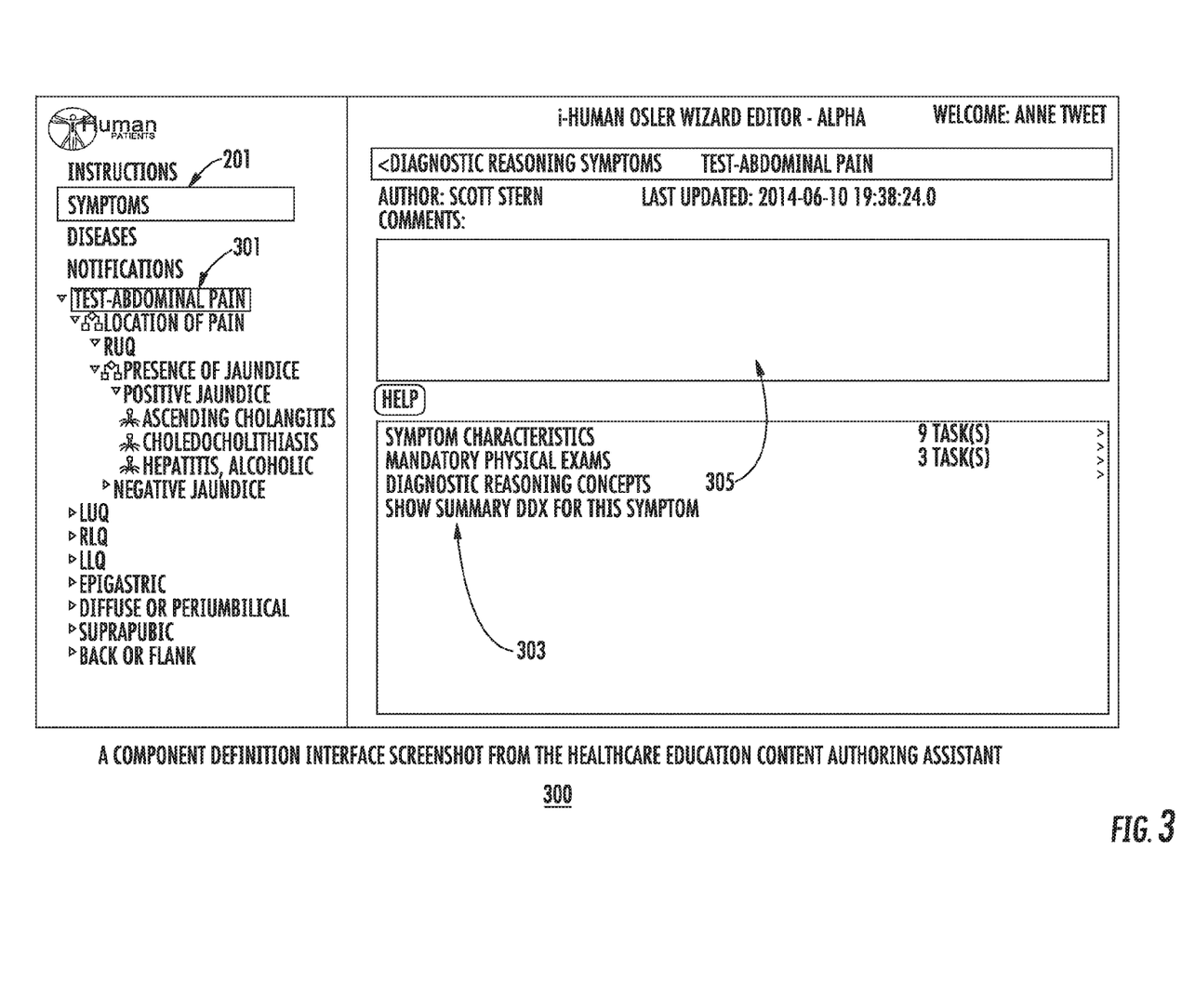
FIG. 3 shows a component definition interface screenshot from the healthcare education content authoring assistant executed on the computer or another electronic device, in accordance with an embodiment of the invention.

FIG. 3 shows a component definition interface screenshot (300) from the healthcare education content authoring assistant executed on the computer or another electronic device, in accordance with an embodiment of the invention. In this embodiment of the invention, the component definition interface for the healthcare education content authoring assistant provides an "Instructions" button, a "Symptoms" button (201), a "Diseases" button, and a "Notifications" button, as shown on a left side of the component definition interface screenshot (300). In FIG. 3, the "Symptoms" button (201) is already selected, and a symptom characterization entry button (301) is additionally selected for characterization of abdominal pain-related tests (i.e. "TEST—Abdominal Pain"). As also shown in the left side of the component definition interface screenshot (300), more detailed parameters, such as the location of pain (i.e. RUQ, LUQ, RLQ, LLQ, Epigastric, Diffuse or periumbilical, Suprapubic, Back or flank), pivotal concepts, and other information associated with a selected symptom (e.g. abdominal pain) can be further selected and defined in a hierarchical tree structure by the healthcare education content authoring assistant software.

In a right side of the component definition interface screenshot (300), a component definition and description entry section interface (303) displays a "Symptom Characteristics" component, a "Mandatory Physical Exams" component, a "Diagnostic Reasoning Concepts" component, and a "Show Summary DDX for this Symptom" component. Each of these components can be selected, defined, and/or described by the healthcare education content author, so that a healthcare trainee can explore and attempt to ask appropriate questions to a virtual patient, order appropriate physical exams, and apply appropriate diagnostic reasoning in evaluating the virtual patient through an electronic healthcare education system that executes the computerized healthcare education content created from the healthcare education content authoring assistant software.

Furthermore, in the right side of the component definition interface screenshot (300), a comments and description interface (305) allows the healthcare education content author to compose and add comments and descriptions associated with a particular component (e.g. the "Symptom Characteristics" component, the "Mandatory Physical Exams" component, the "Diagnostic Reasoning Concepts" component, the "Show Summary DDX for this Symptom" component, and etc.). Defining these components linked to a selected symptom (e.g. "Abdominal Pain") enables the healthcare education content author to describe necessary symptom characteristics, mandatory physical examinations, diagnostic reasoning concepts, and any other important parameters for the selected symptom.

In a preferred embodiment of the invention, the healthcare education content author utilizing the component definition interface and/or any other pertinent interfaces from the healthcare education content authoring assistant software of the present invention identifies, selects, and/or enters questions that should be asked by the healthcare trainee to the virtual patient for a better understanding of the virtual patient's disease or condition. Some of these questions may be generic, while other questions may be specific to the selected symptom (e.g. abdominal pain) in the healthcare education content authoring assistant software. For example, in case of a symptom involving abdominal pain, some of the appropriate questions to the virtual patient may be "Where exactly is the pain?" and "Where does the pain travel?"

Furthermore, in the preferred embodiment of the invention, the healthcare education content author also defines and describes mandatory physical examinations for the selected symptom. For example, for a virtual patient's symptom exhibiting difficulty of breathing, pulmonary and cardiovascular-related physical exams should be defined and described in association with that particular symptom. In another example, for the virtual patient's symptom exhibiting dizziness, neurological exams and blood pressure tests should be defined and described in association with that particular symptom. Once these mandatory physical exams are defined, described, and linked to a particular symptom in the healthcare education content authoring assistant software, a healthcare trainee can learn and explore which physical exams are appropriate for a particular symptom through an electronic healthcare education software that incorporates the computerized healthcare education content created from the healthcare education content authoring assistant software.

Moreover, in the preferred embodiment of the invention, the healthcare education content author also defines and describes diagnostic reasoning concepts and investigations associated with those diagnostic reasoning concepts. For example, a diagnostic tree and an investigative approach to a selected symptom may be devised by the healthcare education content author through a component definition interface (e.g. FIG. 3), a pivotal concept definition interface (e.g. FIG. 4), a pivotal concept rule for results group interface (e.g. FIG. 5), and/or other interfaces of the healthcare education content authoring assistant software.

Figure 4:
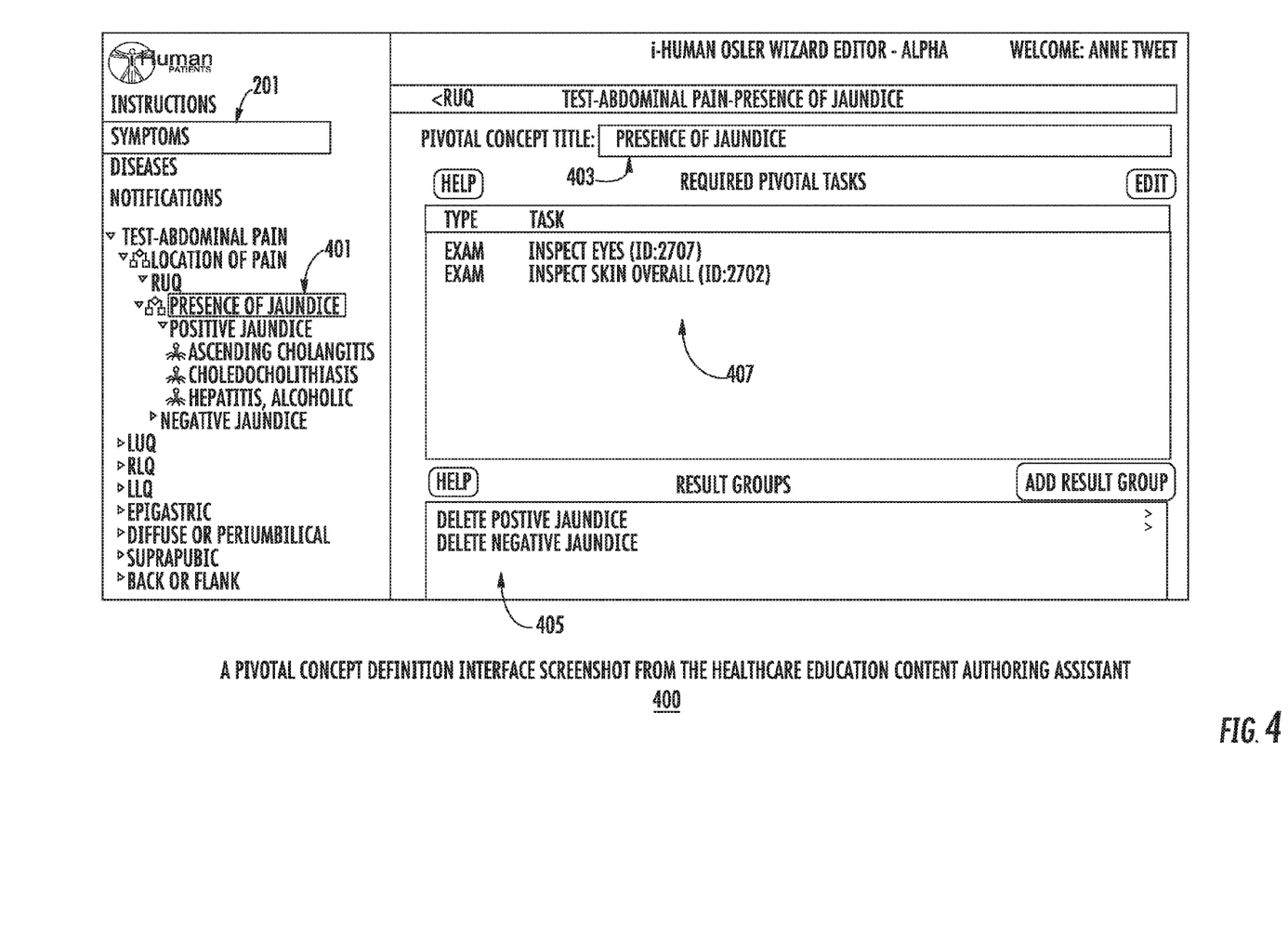
FIG. 4 shows a pivotal concept definition interface screenshot from the healthcare education content authoring assistant executed on the computer or another electronic device, in accordance with an embodiment of the invention.

FIG. 4 shows a pivotal concept definition interface screenshot (400) from the healthcare education content authoring assistant executed on the computer or another electronic device, in accordance with an embodiment of the invention. In this embodiment of the invention, the pivotal concept definition interface for the healthcare education content authoring assistant provides an "Instructions" button, a "Symptoms" button (201), a "Diseases" button, and a "Notifications" button, as shown on a left side of the component definition interface screenshot (400). In FIG. 4, the "Symptoms" button (201) and the symptom characterization entry button (i.e. 301 of FIG. 3 for "TEST—Abdominal Pain") are already selected, and a pivotal concept definition button (401) is additionally selected for defining a pivotal concept named "Presence of Jaundice," as shown on the left side of the component definition interface screenshot (400).

Furthermore, as also shown on the left side of the component definition interface screenshot (400), a hierarchical tree structure with selectable texts or icons can organize a particular pivotal concept (e.g. Presence of Jaundice (401), Positive Jaundice, Negative Jaundice) under a particular results group (e.g. RUQ, LUQ, RLQ, LLQ, Epigastric, Diffuse or periumbilical, Suprapubic, Back or flank), based on content organization preferences of a healthcare education content author.

Continuing with FIG. 4, in a right side of the pivotal concept definition interface screenshot (400), a pivotal concept title section (403) displays a pivotal concept title. In this example, the pivotal concept title is "Presence of Jaundice." The healthcare education content author is able to create, modify, or delete the pivotal concept title by entering, editing, or deleting texts in the pivotal concept title section (403). Furthermore, in the right side of the pivotal concept definition interface screenshot (400), a pivotal tasks entry section (407) allows the healthcare education content author to compose, select, add, or delete one or more pivotal tasks associated with the pivotal concept (i.e. "Presence of Jaundice"). For example, one pivotal task may be inspecting the virtual patient's eyes (i.e. "inspect eyes (Id: 2707)"), and this pivotal task can be categorized as a health diagnostic exam (i.e. "Exam" under the "Type" column). Similarly, another pivotal task may be inspecting the virtual patient's overall skin condition (i.e. "inspect skin overall (Id: 2702)"), and this pivotal task can also be categorized as a health diagnostic exam (i.e. "Exam" under the "Type" column).

As explained previously in description of FIG. 1, specifying key pivotal concepts in the healthcare education content authoring assistant software by the healthcare education content author is an important content-creation step that can guide the diagnostic reasoning process of students and other healthcare trainees. Generally, a pivotal concept (e.g. Presence of Jaundice (401) in FIG. 4) guides a healthcare trainee to limit the broad differential diagnosis to smaller subsets of possibilities. Preferably, each step in the diagnostic reasoning path includes, at most, one pivotal concept to maintain focus and efficiency in the diagnostic reasoning. Furthermore, as shown in the pivotal concept definition interface screenshot (400) of FIG. 4, pivotal concept-related tasks are also specified in one or more interfaces (e.g. the pivotal tasks entry section (407) in the pivotal concept definition interface) of the healthcare education content authoring assistant software. Examples of pivotal tasks include, but are not limited to, health questions, physical exams, and patient tests. The pivotal tasks need to be followed by the healthcare trainee to further direct the diagnostic reasoning process. In context of the pivotal concept definition interface screenshot (400) in FIG. 4, for the pivotal concept of "Presence of Jaundice" (401), inspecting the virtual patient's eyes and overall skin condition are listed as two pivotal tasks that are required to be completed by the healthcare trainee.

Continuing with FIG. 4, the pivotal concept definition interface screenshot (400) also includes a results groups organization section (405), which enables the healthcare education content author to link and specify one or more results groups to the pivotal concept (401). In a preferred embodiment of the invention, the pivotal concept can be utilized to organize groupings of possible diseases for the healthcare trainee to consider. For example, in context of the pivotal concept definition interface screenshot (400) in FIG. 4, the pivotal concept of "Presence of Jaundice" (401) is currently placed under a results group called "RUQ," which is categorized under the "Location of Pain" category that belongs to the symptom characterization category called "TEST—Abdominal Pain," as shown in the hierarchical tree structure with selectable texts or icons.

Figure 5:
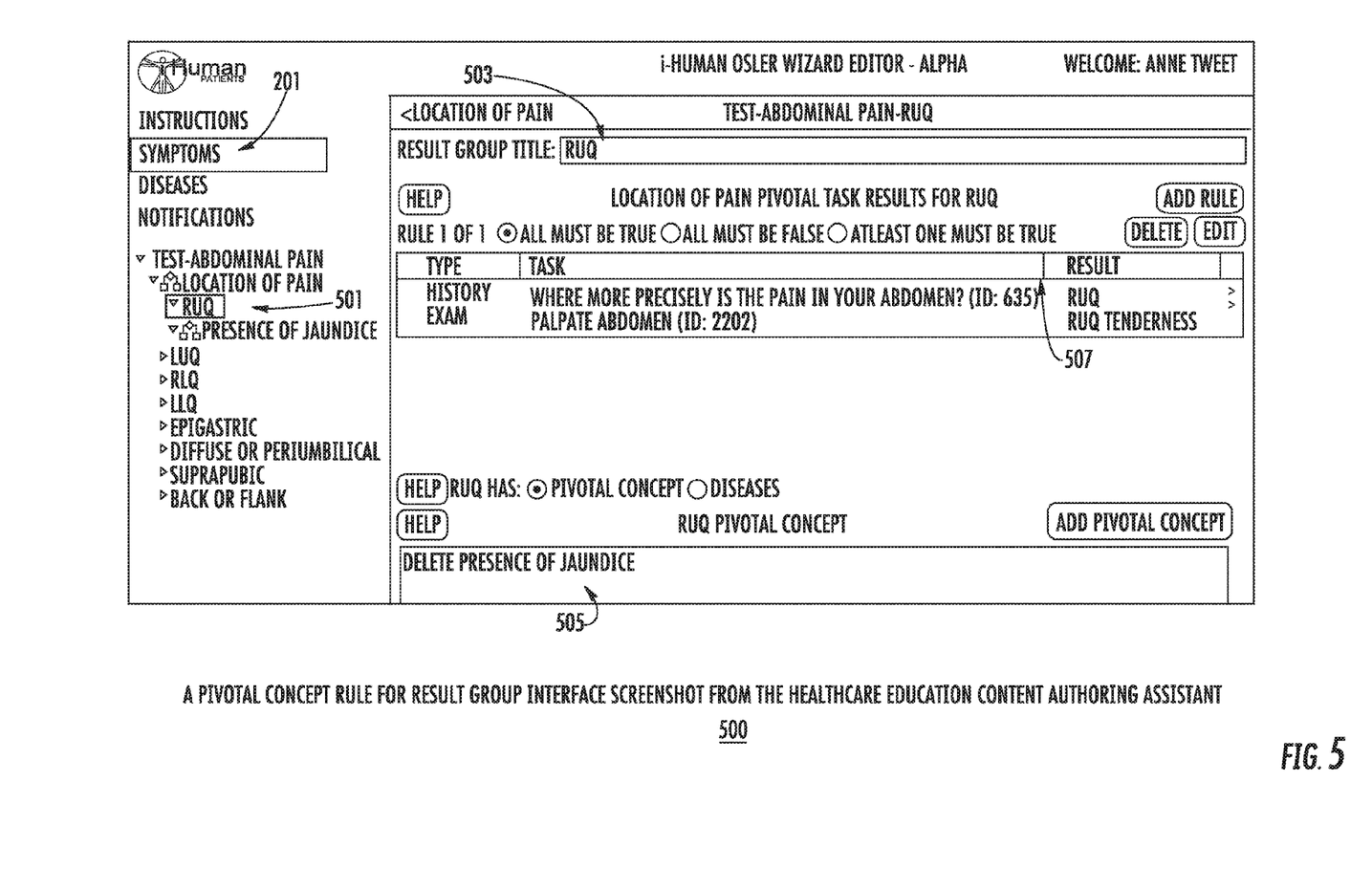
FIG. 5 shows a pivotal concept rule for results group interface screenshot from the healthcare education content authoring assistant executed on the computer or another electronic device, in accordance with an embodiment of the invention.

FIG. 5 shows a pivotal concept rule for results group interface screenshot (500) from the healthcare education content authoring assistant executed on the computer or another electronic device, in accordance with an embodiment of the invention. In this embodiment of the invention, the pivotal concept rule for results group interface provides an "Instructions" button, a "Symptoms" button (201), a "Diseases" button, and a "Notifications" button, as shown on a left side of the component definition interface screenshot (500). In FIG. 5, the "Symptoms" button (201) and the symptom characterization entry button (i.e. 301 of FIG. 3 for "TEST—Abdominal Pain") are already selected, and a results group edit button for the results group "RUQ" (501) is additionally selected for defining and configuring pivotal concept rules for the results group "RUQ," as shown on a hierarchical tree structure with selectable texts or icons on the left side of the results group interface screenshot (500).

Furthermore, in a right side of the pivotal concept rule for results group interface screenshot (500), a results group title section (503) displays a results group title. In this example, the results group title is "RUQ," which is an abbreviation for "right upper quadrant" as a potential pain location of the abdominal pain symptom. The healthcare education content author is able to create, modify, or delete the results group title by entering, editing, or deleting texts in the results group title section (503). Moreover, in the right side of the results group interface screenshot (500), a pivotal tasks results section (507) allows the healthcare education content author to define, link, or create a pivotal concept rule based on a result of a particular pivotal task, which the healthcare trainee completed. The creation of the pivotal concept rule enables the healthcare trainee to explore a particular diagnostic reasoning path based on the result of the particular pivotal task.

In context of the results group interface screenshot (500) in FIG. 5, two pivotal tasks associated with the results group "RUQ" generated results. As shown in the pivotal tasks results section (507), the first pivotal task was asking the virtual patient a precise location of pain in the virtual patient's abdomen, which was answered by the virtual patient as the right upper quadrant (RUQ). The second pivotal task was palpating the virtual patient's abdomen, which showed tenderness in the RUQ area of the abdomen, as also shown in the pivotal tasks results section (507). For these specific results from the pivotal tasks assigned to the healthcare trainee, the healthcare education content author is able to create, define, or edit a pivotal concept rule, as also shown in the pivotal tasks results section (507) in the results group interface screenshot (500). For example, in context of the results group interface screenshot (500) in FIG. 5, the first pivotal task and the second pivotal task must be both true in order to advance the diagnostic reasoning path to the pivotal concept of "Presence of Jaundice." (i.e. 401 of FIG. 4).

In addition, the results group interface screenshot (500) in FIG. 5 also includes a pivotal concept organization section (505), which allows the healthcare education content author to add, delete, specify, and/or link a pivotal concept (e.g. "Presence of Jaundice") to one or more pivotal task results and results groups in the healthcare education content authoring assistant software. For example, in context of the results group interface screenshot (500), the pivotal concept of "Presence of Jaundice" (i.e. 401 of FIG. 4) is currently placed under the results group "RUQ," which is categorized under the "Location of Pain" category that belongs to the symptom characterization category called "TEST-Abdominal Pain," as shown in the hierarchical tree structure with selectable texts or icons.

In a preferred embodiment of the invention, specifying pivotal concept tasks results by the healthcare education content author is an important step for teaching appropriate diagnostic reasoning paths and providing real life-like simulated clinical experiences to healthcare trainees. Pivotal concept tasks and their related results determine diagnostic reasoning paths, based on how the healthcare education content author defines pivotal concept rules in the results group interface and/or other interfaces operated by the healthcare education content authoring assistant software. Furthermore, in the preferred embodiment of the invention, dependent pivotal concepts which are contingent upon a "parent" pivotal concept can be also specified, if necessary. For each results group with a "parent" pivotal concept, the healthcare education content author can compose or select additional pivotal concepts that may depend from the parent pivotal concept, wherein the additional pivotal concepts enable further guidance of the diagnostic reasoning process for the results group.

FIG. 6 shows a differential diagnosis (DDx) group and disease summary interface screenshot (600) from the healthcare education content authoring assistant executed on the computer or another electronic device, in accordance with an embodiment of the invention. In this embodiment of the invention, the differential diagnosis (DDx) group and disease summary interface provides an "Instructions" button, a "Symptoms" button (201), a "Diseases" button, and a "Notifications" button, as shown on a left side of the differential diagnosis (DDx) group and disease summary interface screenshot (600). In FIG. 6, the "Symptoms" button (201), the symptom characterization entry button (i.e. 301 of FIG. 3 for "TEST—Abdominal Pain"), the results group edit button (i.e. 501 of FIG. 5 for "RUQ"), the pivotal concept definition button (i.e. 401 of FIG. 4 for "Presence of Jaundice"), and a dependent pivotal concept button (i.e. "Positive Jaundice") are already selected, and a diagnosed disease button (601) representing "ascending cholangitis" is additionally selected in a hierarchical tree structure with selectable texts or icons on the left side of the differential diagnosis (DDx) group and disease summary interface screenshot (600).

In a preferred embodiment of the invention, selecting the "ascending cholangitis" in the hierarchical tree structure brings a diagnosis reasoning path description (603) and a list of "symptom to diagnosis pathways" section (605) for the diagnosed disease (i.e. "ascending cholangitis"). In context of the differential diagnosis (DDx) group and disease summary interface screenshot (600) in FIG. 6, the diagnosis reasoning path description (603) is "Test—Abdominal Pain=>RUQ=>Positive Jaundice." This path description symbolizes how a particular disease (i.e. "ascending cholangitis") is diagnosed correctly through a series of symptom characterizations, health questions, and/or medical exams. Preferably, if a dynamic DDx mode is selected for a healthcare trainee, the healthcare trainee can correctly diagnose a disease after learning and applying dynamic DDx reasoning, which is based on the understanding of clinical and patient data and empirical probability of disease occurrence relative to geography, age, ethnicity, and other factors associated with a virtual patient.

Continuing with FIG. 6, in the preferred embodiment of the invention, the list of "symptom to diagnosis pathways" section (605) for the diagnosed disease (i.e. "ascending cholangitis") includes a variety of diagnostic reasoning paths, each path of which leads to the diagnosed disease. A particular diagnostic reasoning path can be selected from the list of "symptom to diagnosis pathways" section (605), and typicality for a DDx group associated with a pivotal concept (e.g. Positive Jaundice) can be configured for the particular diagnostic reasoning path, as shown in the differential diagnosis (DDx) group and disease summary interface screenshot (600).

Figure 7:
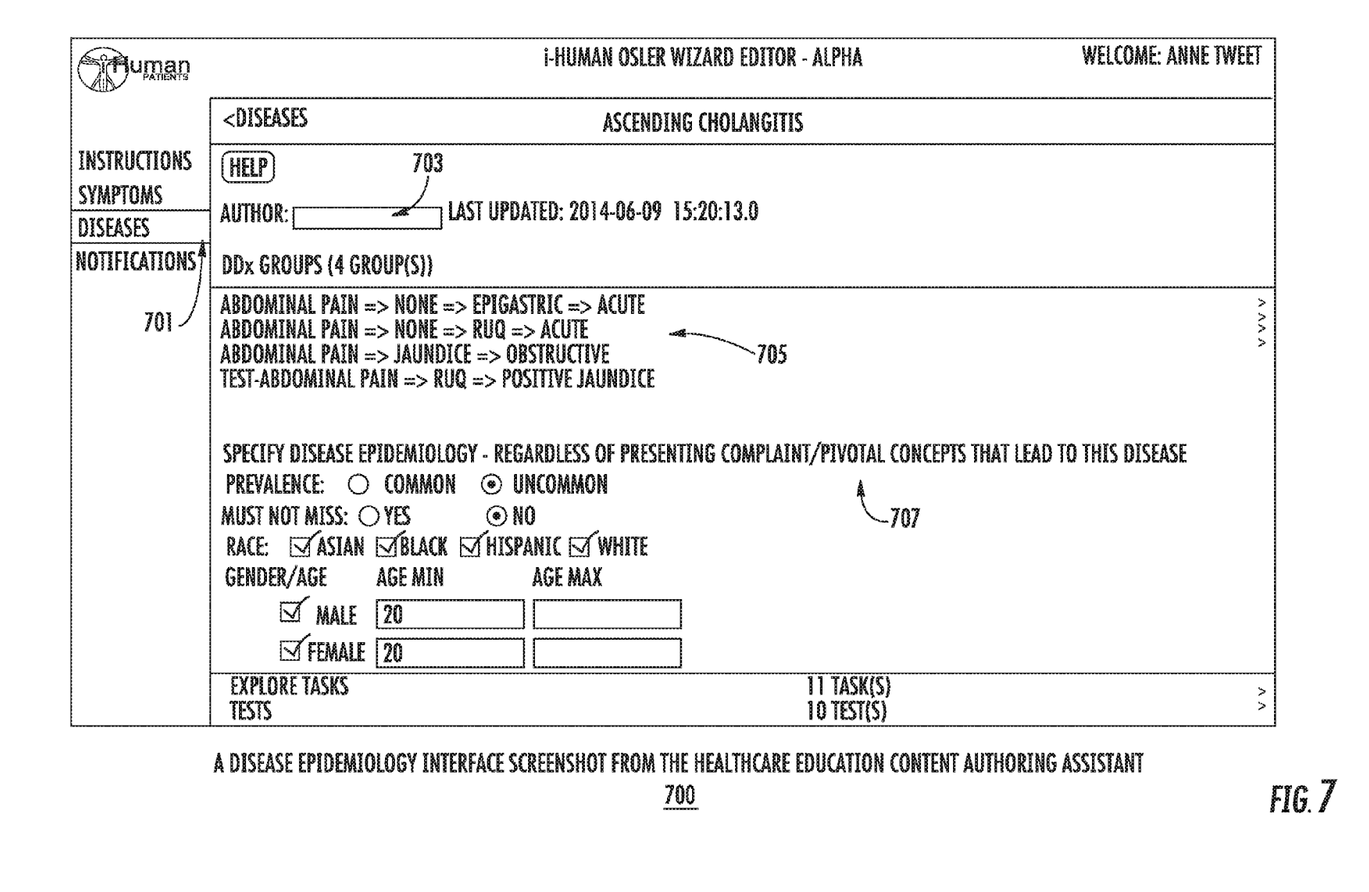
FIG. 7 shows a disease epidemiology interface screenshot from the healthcare education content authoring assistant executed on the computer or another electronic device, in accordance with an embodiment of the invention.

FIG. 7 shows a disease epidemiology interface screenshot (700) from the healthcare education content authoring assistant executed on the computer or another electronic device, in accordance with an embodiment of the invention. In this embodiment of the invention, the disease epidemiology interface provides an "Instructions" button, a "Symptoms" button, a "Diseases" button (701), and a "Notifications" button, as shown on a left side of the disease epidemiology interface screenshot (700). In FIG. 7, the "Diseases" button (701) is selected, which brings up a differential diagnosis (DDx) group list section (705), an author name entry section (703), and an epidemiology configuration section (707) for a diagnosed disease. In context of the disease epidemiology interface screenshot (700) in FIG. 7, the diagnosed disease is ascending cholangitis.

In a preferred embodiment of the invention, for each differential diagnosis (DDx) path entry in the differential diagnosis (DDx) group list section (705), the healthcare education content author can specify disease epidemiology in the epidemiology configuration section (707). Examples of disease epidemiology configuration may include, but are not limited to, prevalence, criticality of a DDx path entry, and race, gender, and age of the virtual patient. The healthcare education content author may also enter or edit his or her name in the author name entry section (703).

FIG. 8 shows an etiology task exploration interface screenshot (800) from the healthcare education content authoring assistant executed on the computer or another electronic device, in accordance with an embodiment of the invention. In this embodiment of the invention, the etiology task exploration interface provides an "Instructions" button, a "Symptoms" button, a "Diseases" button (701), and a "Notifications" button, as shown on a left side of the etiology task exploration interface screenshot (800). Furthermore, in this embodiment of the invention, when the "Diseases" button (701) is selected, an etiology edit section (801) and an etiology summary section (803) are displayed in the etiology task exploration interface for a diagnosed disease. In context of the etiology task exploration interface screenshot (800) in FIG. 8, the diagnosed disease is ascending cholangitis.

In a preferred embodiment of the invention, the etiology summary section (803) displays a summary of explore tasks used by etiology. To edit any of the entries in the etiology summary section (803), the healthcare education content author can select a particular explore task entry in the etiology summary section (803), and then add or modify information associated with the particular explore task in the etiology edit section (801).

FIG. 9 shows a test diagnostics strategy and pitfalls interface screenshot (900) from the healthcare education content authoring assistant executed on the computer or another electronic device, in accordance with an embodiment of the invention. In this embodiment of the invention, the test diagnostics strategy and pitfalls interface provides an "Instructions" button, a "Symptoms" button, a "Diseases" button (701), and a "Notifications" button, as shown on a left side of the test diagnostics strategy and pitfalls interface screenshot (900). In this embodiment of the invention, when the "Diseases" button (701) is selected, a test strategy entry section (901), a diagnostic pitfall note entry section (903), and a required test list section (905) are displayed in the test diagnostics strategy and pitfalls interface for a diagnosed disease. In context of the test diagnostics strategy and pitfalls interface screenshot (900) in FIG. 9, the diagnosed disease is ascending cholangitis.

In a preferred embodiment of the invention, the healthcare education content author can select a required test task entry from the required test list section (905). For the selected required test task entry, the healthcare education content author can enter instructions, comments, and notes into the test strategy entry section (901) to guide the healthcare trainee to administer the selected required test task on the virtual patient. Similarly, the healthcare education content author can enter comments and notes into the diagnostic pitfall note entry section (903) to guide the healthcare trainee away from common diagnostic pitfalls.

Various embodiments of the invention have been described above and also illustrated in part by FIGS. 1~9. The present invention provides several advantages over conventional healthcare education content authoring methods. First, unlike a conventional healthcare education content authoring method that requires cumbersome modifications of computer programming codes with an in-depth understanding of the underlying programming architecture, an embodiment of the present invention provides a novel and intuitive healthcare content authoring software platform that a healthcare education content author can readily utilize to configure, provide, and update computerized medical training and evaluation contents to medical students and other healthcare trainees.

Furthermore, by incorporating a novel healthcare education content authoring assistant software in the healthcare content authoring software platform to provide interactive suggestions based on clinical and patient research data, the healthcare education content author can create unique electronic learning contents that teach and nurture basic differential diagnosis skills, dynamic differential diagnosis reasoning skills, and other empirical clinical reasoning skills in a virtual patient simulation environment for medical students, other healthcare trainees, and healthcare industry professionals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A healthcare education content authoring assistant system with an interactive suggestion interface based on patient and clinical research data, the system comprising:
    a symptom selection interface module that generates a list of diagnostic reasoning symptoms and prompts a healthcare education content author to select a symptom of educational interest;
    a virtual patient examination simulator interface module that renders a computer graphics animation of a virtual physical exam diagnostic device and a real-time motory change to an organ or a body part of an animated virtual patient when a user's diagnostic gesture pattern is drawn with a mouse or a finger on top of the animated virtual patient on a display screen, wherein the virtual patient examination simulator interface prompts the user to specify diagnostic prediction indicators for a diagnostics result before invoking the user's diagnostic gesture pattern to initiate a diagnostics test and determine correctness of the user's diagnostic indicators, wherein the real-time motory change to the organ or the body part and the diagnostics test is associated with an ocular motor examination, and wherein the user's diagnostic gesture pattern drawn on top of the animated virtual patient is an "H" pattern gestured over the animated virtual patient's eyes with the mouse or the finger;
    an interactive suggestion interface that suggests and recommends additions or modifications to the healthcare educational content author by providing clinically empirical and meaningful information gathered from real-life patient and clinical research data, generating a robust set of clinical research data sets from the clinically empirical and meaningful information, wherein the robust set of clinical research data sets comprises sensitivity and specificity information and diagnosis likelihood ratios for all possible diagnosis, and dynamically linking the robust set of clinical research data sets to the interactive suggestion interface;
    a component definition interface module that defines and configures symptom characteristics, mandatory physical exams, and diagnostic reasoning concepts for the symptom of educational interest;
    a pivotal concept definition interface module that defines a pivotal concept, a pivotal concept task, and an association among the pivotal concept, the pivotal concept task, and a results group;
    a pivotal concept rule for results group interface module that defines and describes a result of the pivotal concept task and a pivotal concept rule, wherein the pivotal concept rule associates or disassociates the result of the pivotal concept task with the pivotal concept;
    a differential diagnosis (DDx) group and disease summary interface module that displays a symptom-to-diagnosis reasoning path that shows links among the symptom of educational interest, the pivotal concept, the pivotal concept task, the result of the pivotal concept task, the pivotal concept rule, and one or more diseases, wherein the symptom-to-diagnosis reasoning path is additionally flagged as typical or atypical for a DDx group; and
    a central processing unit (CPU) and a memory unit of a computer system or another electronic device, wherein the CPU and the memory unit execute at least one of the symptom selection interface module, the virtual patient examination simulator interface module, the component definition interface module, the pivotal concept definition interface module, the pivotal concept rule for results group interface module, and the differential diagnosis (DDx) group and disease summary interface module.

2. The healthcare education content authoring assistant system of claim 1, further comprising a disease epidemiology interface module that configures, defines, and describes epidemiology for the symptom-to-diagnosis reasoning path.

3. The healthcare education content authoring assistant system of claim 1, further comprising an etiology task exploration interface module that configures, defines, and describes an etiology entry and a related exploration task for a diagnosed disease.

4. The healthcare education content authoring assistant system of claim 1, further comprising a tests diagnostics strategy and pitfalls interface module that configures, defines, and describes a test strategy and a diagnostic pitfall for a diagnosed disease.

\* \* \* \* \*